Dec. 5, 1939.   F. R. KAIMER   2,182,668
ELECTRICAL CONDUCTOR AND INSULATION THEREFOR
Filed April 14, 1937

Inventor:
Fred R. Kaimer,
by Harry E. Dunham
His Attorney

Patented Dec. 5, 1939

2,182,668

UNITED STATES PATENT OFFICE 2,182,668

ELECTRICAL CONDUCTOR AND INSULATION THEREFOR

Fred R. Kaimer, York, Pa., assignor to General Electric Company, a corporation of New York Application April 14, 1937, Serial No. 136,757

5 Claims. (Cl. 174—121)

The present invention relates to electrical conductors and insulation therefor. It is more particularly concerned with electrical cables insulated with composite insulation.

In cables comprising felted asbestos superposed directly on a layer of varnished cambric, substantial rubbing or abrasion of the varnished cambric, and particularly of the outer layer thereof, takes place during the process of applying the asbestos and during subsequent handling of the insulated cable. This abrasive action often causes the varnish on the outer layer of the tape to flake off, thereby creating pin holes in the tape. As a result such cable either fails to pass electrical and other tests to which it is subjected prior to use or has a comparatively short service life. Another cause of damage to the outer layer of varnished cambric tape results from solvent attack by compositions used in impregnating and coating asbestos to produce electrical cables of improved moisture and flame resistance.

I have found that various electrically insulating substances, for instance cellulosic materials, such as regenerated cellulose or cellulose esters such as the cellulose acetate, even in very thin films, for example 1 to 2 mils thick, will withstand the normally abrasive action of materials such as asbestos both during the process of making an electrical cable and during subsequent handling and service use. Such materials also are impervious to, and are not detrimentally affected by compositions commonly used in impregnating asbestos.

Figure 1:
Figure 2:
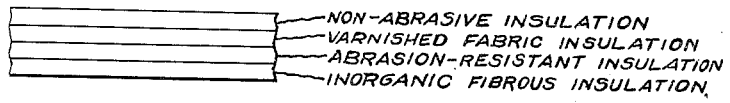
Figure 3:
Figure 4:
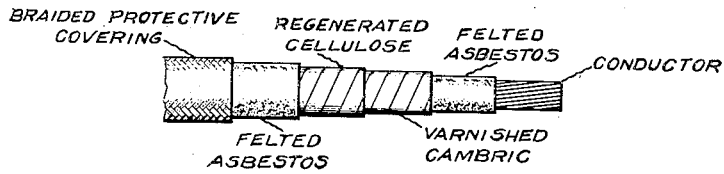

Figures 1, 2 and 3, in the accompanying drawing, illustrate various modifications of composite insulation of my invention. Figure 4 is a fragmentary view in elevation of a cable comprising a stranded conductor provided with composite insulation showing another modification of the invention.

As illustrative of the practical aspects of my invention it is mentioned that varnished cambric tape which, before use in constructing a so-called "asbestos-varnished cambric" type of cable had an initial volt per mil breakdown of 1100 volts, showed a breakdown as low as 240 volts per mil when the tape was removed from the completed cable for test purposes. A similar test on varnished cambric tape protectively covered with regenerated cellulose in constructing the cable, and the tape subsequently removed from the cable and tested, had a dielectric strength substantially the same as the unused tape. By preventing injury to the varnished fabric layer, composite insulation of higher average dielectric strength results. The moisture resistance of the insulation also is improved.

The protective layer for the varnished fabric should be flexible, moisture- and abrasion-resistant and, preferably, of high dielectric strength and smooth-surfaced. It may consist of materials other than regenerated cellulose (Cellophane) or cellulose acetate. For instance, pyroxylin (cellulose nitrate) may be employed. Or, it may consist of paper having a special impervious finish, such as pyroxylin-coated paper or paper bonded to, or otherwise covered with Cellophane, cellulose acetate or the like. Other materials than those of a cellulosic nature may comprise the protective layer, for example rubber hydrochloride compositions such, for instance, as material known under the trade name of "Pliofilm".

Inorganic fibrous materials other than asbestos may be used, for example, spun glass and mineral wool. Cambric, muslin or other fabric material impregnated and coated with any type of bituminous or resinous electrically insulating coating composition may be employed.

It will be understood that the composite insulation may include other electrically insulating materials. For example, rubber, paper, cotton, resins such, for instance, as flexible alkyd resins, plasticized polymerized vinyl compounds such as plasticized polymerized vinyl chloride, and the like may be used. Such non-abrasive insulating materials may be superposed on the combination of insulating materials to which this invention is particularly directed as shown in Figure 2. The composite insulation illustrated in this figure may be superposed on a conductor with either the non-abrasive insulating layer or the inorganic fibrous layer applied first. If desired or if conditions so require, the composite insulation shown in Figure 1 may be sandwiched between such non-abrasive insulating materials as those just mentioned by way of example. As shown in Figure 3, varnished fabric may be protectively covered on both sides with abrasion-resistant material and over the latter may be applied inorganic fibrous material. Such composite insulation then may be combined with non-abrasive insulating materials as has been described. As shown in Figure 4, only the outer surface of the varnished cambric layer, if desired, may be covered with abrasion-resistant material such as regenerated cellulose to protect said cambric from a superposed layer of asbestos.

Instead of applying the varnished fabric, the protective medium therefor, and the inorganic fibrous material separately to a conductor, these materials may be applied as a unit. For example, to either side or both sides of varnished cambric or other fabric may be united by any suitable means a layer or layers of a flexible, moisture- and abrasion-resistant material such as one or more of those previously mentioned. To the side or sides of the protectively covered fabric then may be bonded a layer or layers of asbestos or other inorganic fibrous material compacted to form a dense, homogeneous mass. The component materials may be united by any suitable means, for example, under pressure, or under heat and pressure, and with or without an adhesive for uniting the individual layers depending upon the plasticity and bonding properties of the components when subjected to pressure or simultaneously to the action of heat and pressure.

It is essential for covering wires that the unitary structure be flexible. This is accomplished by selecting flexible component materials. Obviously, flexibility also is influenced by the thickness of the entire structure.

The insulation herein described is applied to a conducting surface such as a metallic core of stranded or solid wire in any known manner, as for example, by the strip covering method.

Electrical conductors provided with heat-, flame-, and moisture-resisting composite insulation in accordance with this invention are particularly adapted for the wiring of switchboards, mining machinery, electric locomotives, rheostats, controllers, cranes, motors, generators, and the like, especially where there are boilers, furnaces or other sources of heat.

What I claim as new and desire to secure by Letters Patent of the United States is:

1. In an insulated electrical conductor, a metallic conductor element and insulation therefor comprising varnished fabric and inorganic fibrous insulating materials the former being susceptible of abrasion by the latter, and a relatively thin sheet of moisture and abrasion-resistant electrically insulating material therebetween and in contact therewith whereby the varnished fabric is protected from the abrasive action of the inorganic fibrous material.

2. An insulated electrical conductor comprising a metallic conducting core and insulation therefor comprising varnished cambric and asbestos layers the former being susceptible of abrasion by the latter, and between said layers and in contact therewith a relatively thin sheet of flexible moisture and abrasion-resistant material of high dielectric strength serving to prevent abrasion of the varnished cambric by the asbestos.

3. An electrical cable comprising a metallic conducting core and insulation therefor comprising varnished cambric and asbestos layers the varnished cambric being susceptible of abrasion by the asbestos, and a relatively thin sheet of regenerated cellulose between said layers and in contact therewith to prevent abrasion of the varnished cambric by the asbestos.

4. An electrical cable comprising a metallic conducting core and insulation therefor comprising varnished cambric and asbestos layers the varnished cambric being susceptible of abrasion by the asbestos, and a relatively thin sheet of cellulose acetate between said layers and in contact therewith to prevent abrasion of the varnished cambric by the asbestos.

5. Electrical insulation composed of layers of inorganic fibrous insulating material and varnished fabric material the latter being susceptible of abrasion by the former, and between said layers and in contact therewith a relatively thin sheet of flexible moisture and abrasion-resistant material of high dielectric strength serving to prevent abrasion of the varnished fabric material by the inorganic fibrous material.

FRED R. KAIMER.